(No Model.)
G. E. WITHERELL.
CUTTING OFF AND FORMING TOOL.
No. 504,688. Patented Sept. 5, 1893.
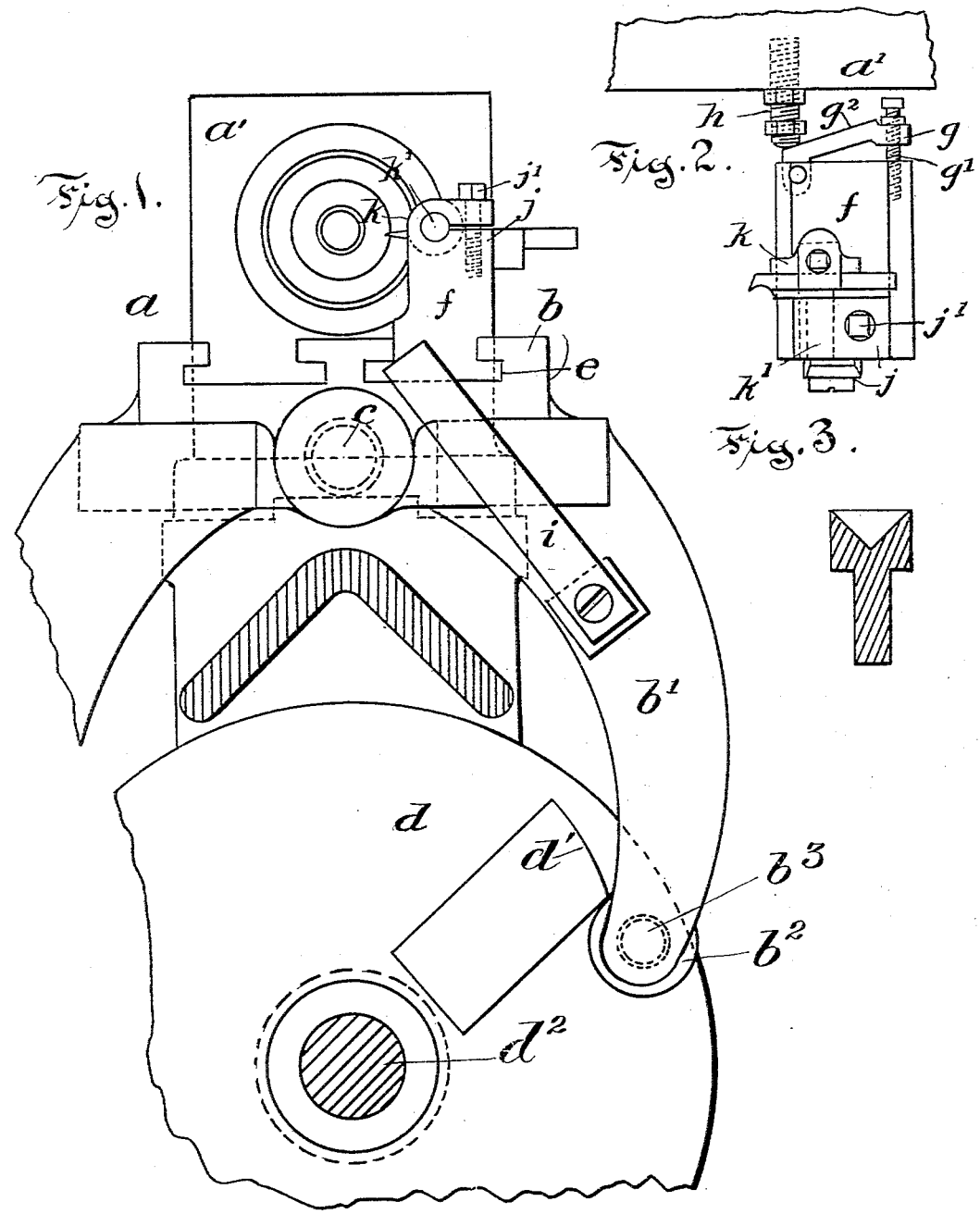
Witnesses:
Joseph Arthur Cantin.
Arthur B. Jenkins.
Inventor:
George E. Witherell,
by Chas. L. Burdett,
Attorney

UNITED STATES PATENT OFFICE.

GEORGE E. WITHERELL, OF HARTFORD, CONNECTICUT, ASSIGNOR TO THE HARTFORD MACHINE SCREW COMPANY, OF SAME PLACE.

CUTTING-OFF AND FORMING TOOL.

SPECIFICATION forming part of Letters Patent No. 504,688, dated September 5, 1893.

Application filed November 12, 1892. Serial No. 451,819. (No model.)

*To all whom it may concern:*

Be it known that I, GEORGE E. WITHERELL, of Hartford, in the county of Hartford and State of Connecticut, have invented certain new and useful Improvements in Cutting-Off and Forming Tools, of which the following is a full, clear, and exact description, whereby any one skilled in the art can make and use the same.

My within described invention relates more particularly to what are known as screw making machines in which a rod of metal of suitable size and length is fed through a spindle, or other like support to the tools which form the screw or other object to shape and cut it off from the end of the rod.

The object of my invention is to provide means and devices usable in a screw machine or other like tool, for shaping the end of the article formed in the machine and also for automatically cutting it off from the rod.

To this end my invention consists in the details of the several parts making up the cutting off and forming tool as a whole and in the combination of such parts as more particularly hereinafter described and pointed out in the claims.

Referring to the drawings:—Figure 1 is a detail view in vertical section of part of a screw cutting machine showing only that part which immediately relates to my invention. Fig. 2 is a detail top view of those parts embodying my invention. Fig. 3 is a detail view in central section of a piece of work showing a conical recess such as is formed by the cutting off tool.

In the accompanying drawings the letter $a$ denotes the frame of a screw cutting or like machine tool, the greater part being cut away and only so much as directly pertains to my improvement being shown. The bed-piece $b$ is pivotally supported on a pin $c$ that is secured to the frame in such manner as to allow a rocking movement to be imparted to the bed-piece in a direction across the axis of the work holding arbor. The rocking movement is imparted to this bed-piece by means of a cam $d'$ borne on a cam wheel $d$, fast to the shaft $d^2$ an arm $b'$ projecting downward from the bed-piece $b$ being arranged in operative connection with the cam $d'$ preferably by means of a roller $b^2$ borne on a pivot pin $b^3$ on the arm so as to reduce the friction. This part of the mechanism is that which is commonly used to move a tool held in the bed-piece into operative relation with the work in order that a certain part of the shaping operation may be performed, as either the turning down a rod, or cutting a thread, or shaping a shoulder. In the upper part of this bed-piece in a way $e$ there is arranged a reciprocating carriage $f$, the carriage being held in place by flanges that take into grooves on each side of the base that is preferably T-shaped. The carriage $f$ is adapted to move along the bed in a line across the direction of its other movement which it has when the bed and carriage are moved together in the rocking movement above described. This movement of the carriage along the bed I term the lengthwise, and the other the transverse movement of the carriage.

On one end of the carriage preferably that adjacent to the headstock $a'$, or other fixed part of the frame of the machine, there is supported an adjustable former $g$ that is pivoted to the carriage at one end and is provided with an adjusting screw $g'$ by means of which the exact position of the cam surfaces $g^2$ of the former can be adjusted at any desired angle with the line of movement of the carriage.

In a socket in the headstock $a'$ or other fixed part, an adjustable contact block $h$ is arranged the outer end of it so placed that when the carriage is moved in the rocking movement of the bed toward and from the axis of the work the cam $g$ rubs along the surface of the contact block $h$ and moves the carriage in a direction and to an extent depending upon the position of this cam surface with reference to its line of movement. The carriage is thrust toward the headstock with a yielding pressure by means of a spring $i$ or like device. In case the spring is used it is preferably secured to the side of the bed-piece with the free end thrusting against the side of the carriage as shown.

On the carriage there is arranged a tool post $j$ operated by means of a clamping screw $j'$ to hold the shank $k'$ of a tool holder $k$. This tool holder is adapted to support any convenient form of tool depending upon the work to be performed. The parts are arranged in the within described embodiment of my invention with a tool suitable for cutting off a piece of work from a rod and at the same time forming a concave recess in the end of the piece cut off. This is accomplished by the lengthwise sliding movement that is imparted to the carriage by means of the cam and former $g$ during the time in which the tool is being moved forward toward the work by the rocking movement of the bed-piece. The direction taken by the cutting point of the tool is the resultant of the two motions imparted to the carriage and as stated, the degree, extent and direction of this movement can be controlled by the permissible adjustment of the former.

It is obvious that the tool holding carriage may be supported otherwise than by the specific channel and tongue shown and my invention is not limited to such specific means of supporting and guiding the carriage on the bed.

I claim as my invention—

1. In combination in a machine tool, a movable bed and means for moving it in a direction across the axis of the work holding arbor, the tool holding carriage arranged on said bed and adapted to move lengthwise thereon, an adjustable former borne on said carriage, a spring adapted to hold the carriage normally in engagement with the contact block, a contact block secured to a fixed part of the frame of the machine, and a tool holder borne on the carriage, all substantially as described.

2. In combination in a machine tool, a rocking bed piece $b$ having a transverse carriage support $e$, a tool holding carriage $f$ arranged on said bed and adapted to move lengthwise thereon, the adjustable former $g$ arranged on the end of said carriage, the spring $i$ adapted to thrust the carriage $f$ with a yielding pressure toward the contact block $h$, the adjustable contact block $h$ secured to the fixed part $a'$ of the frame and a tool holder $j$ and cam $j'$ borne on the carriage, all substantially as described.

GEORGE E. WITHERELL.

Witnesses:
CHAS. L. BURDETT,
ARTHUR B. JENKINS.